United States Patent [19]

Whalen-Shaw

[11] Patent Number: 5,320,672

[45] Date of Patent: Jun. 14, 1994

[54] ASSOCIATIVELY DISPERSED PIGMENTS AND COATINGS CONTAINING SAID PIGMENTS

[76] Inventor: Michael Whalen-Shaw, 7041 Zane Trail Rd., Circleville, Ohio 43113

[21] Appl. No.: 101,088

[22] Filed: Aug. 2, 1993

Related U.S. Application Data

[63] Continuation of Ser. No. 808,661, Dec. 17, 1991, abandoned.

[51] Int. Cl.$^5$ .......................................... C09D 133/08
[52] U.S. Cl. ........................ 106/287.24; 106/138; 106/154.1; 106/213; 106/468; 106/437; 106/486; 106/499; 524/543; 524/555
[58] Field of Search ............... 106/15.05, 486, 419, 106/401, 499, 416, 138, 154.1, 213, 287.24; 210/701; 252/351; 524/543, 555

[56] References Cited

U.S. PATENT DOCUMENTS

| | | | |
|---|---|---|---|
| 3,736,165 | 5/1973 | Sawyer et al. | 106/487 |
| 4,384,096 | 5/1983 | Sonnabend | 526/313 |
| 4,514,552 | 4/1985 | Shay et al. | 526/301 |
| 4,517,098 | 5/1985 | Hann et al. | 210/701 |
| 4,600,761 | 7/1986 | Ruffner et al. | 526/270 |
| 4,616,074 | 10/1986 | Ruffner | 526/318 |
| 4,743,698 | 5/1988 | Ruffner et al. | 549/478 |
| 4,792,343 | 12/1988 | Hawe et al. | 44/51 |

FOREIGN PATENT DOCUMENTS

0003235 8/1979 European Pat. Off. .

OTHER PUBLICATIONS

Jorg Schroder, "Progress in Organic Coatings", (1988), vol. 16, pp. 3-17.
Robert D. Athey, Jr., "Polymeric Organic Dispersants for Pigments: Useful Structures and Their Evaluations", Oct., 1975), vol. 58, No. 10, pp. 55-61.

*Primary Examiner*—Paul Lieberman
*Assistant Examiner*—Margaret Einsmann
*Attorney, Agent, or Firm*—Tarolli, Sundheim & Covell

[57] ABSTRACT

The present invention resides broadly in a dispersion of particles in a fluid medium which contains a polymeric dispersing agent. The particles are hydrophilic particles. The fluid medium has less than 0.5% by weight electrolyte based on the weight of the fluid medium. The polymeric dispersing agent is associative in nature, comprising hydrophilic moieties capable of adsorbing onto the particles, and hydrophobic moieties capable of interaction between themselves in the dispersion, or in a coating comprising the dispersion. The polymeric dispersing agent has a molecular weight in the range of 1,000 to 20,000, preferably in the range of 1,500 to 5,000, and is present in the dispersion in an amount in the range of 0.01 to 2.5 weight percent based on the weight of the particles which are dispersed.

17 Claims, 4 Drawing Sheets

ASSOCIATIVELY DISPERSED PIGMENTS AND COATINGS CONTAINING SAID PIGMENTS

This is a continuation of copending application Ser. No. 07/808,661, filed on Dec. 17, 1991, now abandoned.

TECHNICAL FIELD

The present invention relates to associative dispersions of particles in a fluid medium, and to compositions containing such dispersions. The present invention will be described with particular reference to a dispersion of hydrophilic particles in an aqueous medium, for instance a dispersion containing kaolin clay useful in the preparation of paper coatings. However, it will be apparent to those skilled in the art that the present invention has other applications, for instance, in paint coatings, in ink pastes, and in the manufacture of paper, rubber articles, and plastics.

BACKGROUND OF THE INVENTION

In paper coatings, kaolin clay is often a major component. Kaolin clay is traditionally manufactured by a series of steps which may include bleaching, floatation, particle size fractionation, magnet treatment, and dispersion. Like other pigments, such as titanium dioxide, calcium carbonate, and talc, it must be dispersed. However, unlike other pigments, it is traditionally dispersed in the final stages of processing from an acidic filter cake. Normally, the dispersion is carried out with the combination of soda ash and sodium polyacrylate. This produces an approximately 60% solids dispersed filter cake. Dried clay is then back-added to the dispersion to achieve a normal shipping solids content of about 70%.

Traditionally, in paper coatings, dispersed clay is used with other coating ingredients. A latex, such as styrene butadiene, with other functional monomers, such as itaconic acid, is often used. Although these lattices are usually employed with hydrocolloids which provide viscosity and water retention for the coating process, increased levels of carboxylation on the latex, or introduction of an associative thickener, may provide a sole binder system. Both sole binder lattices and hydrocolloids, such as carboxymethyl cellulose and hydroxyethyl cellulose, influence the wet coating structure. The result is that the flow characteristics are changed from the basic dispersed clay.

It is normal for the high shear viscosity to be increased. The solids of these coatings must be adjusted to provide runnability, required for a defect-free coating. With the trend towards increased blade coating speeds, a common approach toward formulation is to search for lower high shear viscosity. However, with lower high shear viscosity, achieved by either lowering solids content, or judicious selection of coating materials, a compromise in loss of holdout of the coating may occur. This may occur through pressure penetration in the roll applicator before the blade, pressure penetration into the paper at the blade, or penetration due to base stock decompression after the blade. The problem faced by the formulator of blade coatings thus continues to be one of coating design in terms of achieving a satisfactory balance between runnability and coating holdout.

DESCRIPTION OF THE PRIOR ART

Those skilled in the art have, for a long time, had the ability to disperse pigment in water or a solvent base medium. The type of dispersant is chosen to match both the pigment and the medium. A general review of pigment dispersion is given in the publication "Progress in Organic Coatings", by Jorg Schroder, Vol. 16 (1988), pages 3-17, and in the publication "Polymeric Organic Dispersants for Pigments: Useful Structures and Their Evaluations", by Robert D. Athey, Jr., Tappi, Vol. 58, No. 10, (October, 1975) pages 55-61.

In water based coatings, such as for the coating of paper, or for paint, sodium salts of polymers or copolymers or acrylic acids, e.g., sodium acrylate, as taught in U.S. Pat. No. 3,736,165 (Edgar W. Sawyer, Jr.), have found wide utility because of their efficiency, lack of temperature and dosage sensitivity, and biological inertness.

U.S. Pat. No. 4,792,343 (Hawe et al.) discloses the use of a polymeric dispersing agent to disperse hydrophilic particles, such as bentonite clay, in an aqueous medium. The aqueous medium has a high electrolyte concentration, above 0.5%. The polymeric dispersing agent comprises 30%-99% of a water-soluble monomer and 1%-70% of a monomer that has a pendant group $-A_mB_nA_pR$. R is a hydrophobic group containing at least eight carbon atoms. The molecular weight of the polymer is in the range of 500 to 100,000. Preferred water-soluble monomers are ethylenically unsaturated compounds which are free of constituents creating side chains of more than twelve chain atoms and free of hydrophobic groups. The dispersing agent functions as a thinning agent which allows the solids concentration to be higher than would normally be possible without the dispersant. This suggests that no associative behavior of the dispersant was observed or sought by the patentees, possibly due to the high electrolyte concentration of the aqueous medium, or to the fact that the material being dispersed which was used by the patentees was bentonite clay.

European Patent No. 003235 discloses the use of copolymers of ethylenically unsaturated ionic monomers with acrylate esters of ethoxylated hydrophobic alkyl groups for dispersing pigments in paints. About 10% by weight copolymer, based on the dry solids in the paint, is used. At this level, the copolymer functions as a conventional "associative" thickener and the dispersability or antisettling function is likely provided by the increased liquid phase viscosity which is achieved.

U.S. Pat. No. 4,517,098 (Hann et al.) discloses a method for dispersing inorganic materials in aqueous systems. The method uses, as a dispersant, a low molecular weight copolymer of acrylic acid, having a molecular weight in the range of 2,000-5,000. The copolymer comprises about 85-97 weight percent acrylic acid and about 3-15 weight percent of a hydrophobic comonomer. The comonomer is a lower alkyl acrylate having 2 to 8 carbon atoms in the alkyl group, and lower alkyl methacrylates having 1 to 8 carbon atoms in the alkyl group. These chain lengths are insufficient for interaction to occur between the hydrophobes.

In recent years, a new class of thickeners, termed "associative thickeners", have found utility in the paint, printing paste and paper coating fields. The thickeners are hydrophobically modified water-soluble polymers. The term "associative" refers to the manner in which the hydrophobe moieties of the polymers interact with each other and with other ingredients of the coating, such as the pigment and/or the latex binder, to form a network in which the pigment and binder particles are immobilized.

The Tappi Journal, April, 1991, in an article entitled "Associative Behavior of Cellulosic Thickeners and Its Implications on Coating Structure and Rheology", T. S. Young, et al., pages 197-207, discloses the use of a modified hydroxyethyl cellulose as an associated thickener in a composition containing fine kaolin clay, ground calcium carbonate and styrene-butadiene latex. The modified hydroxyethyl cellulose thickeners provided a clay/latex network which was shear thinning in the sense that it could be readily broken by shear force, due to weak hydrophobic association.

U.S. Pat. No. 4,384,096 (Sonnabend) discloses that aqueous liquid emulsion polymers can be prepared by the copolymerization of $C_3$–$C_8$ $\alpha$, $\beta$-ethylenically unsaturated carboxylic acid monomers, a non-ionic copolymerizable $C_2$–$C_{12}$ $\alpha$, $\beta$-ethylenically unsaturated monomer, and certain nonionic vinyl surfactant esters. These materials, when adjusted to a pH of 5.5 or higher, are effective thickeners for latex paint. They provide high viscosity at high shear for reduced spattering and easy application, while providing low viscosity at low shear for flow and levelling.

U.S. Pat. No. 4,600,716 to Charles G. Ruffner et al., discloses acrylic emulsion copolymers containing (A) a urethane surfactant monomer obtained by condensing a non-ionic polyhydric alcohol or primary amine-based surfactant with a monoethylenically unsaturated monoisocyanate, (B) an $\alpha$, $\beta$-ethylenically unsaturated carboxylic acid monomer, (C) a non-ionic $\alpha$, $\beta$-ethylenically unsaturated monomer, and (D) optionally a polyethylenically unsaturated cross-linking monomer. The polymers are formulated to provide thickening in paper coatings and other applications.

Similar disclosures are contained in U.S. Pat. No. 4,616,074 (Ruffner) and U.S. Pat. No. 4,743,698 (Ruffner et al.), both assigned to the same assignee as the assignee of the '761 patent.

An additional type of associative thickener is an alkali soluble hydrophobically modified urethane acrylic polymer such as disclosed in U.S. Pat. No. 4,514,552 (Shay et al.).

All of these associative thickeners have in common the presence of hydrophilic moieties and hydrophobic moieties contained within the same polymer. Additionally, a critical aspect of the thickeners is a sufficient molecular weight, in the range of 100,000 to 300,000, to provide thickening efficiency.

SUMMARY OF THE INVENTION

The present invention resides broadly in a dispersion of particles in a fluid medium which contains a polymeric dispersing agent. The fluid medium has less than 0.5% by weight electrolyte based on the weight of the fluid medium. The polymeric dispersing agent is associative in nature, comprising hydrophilic moieties capable of adsorbing onto the particles, and hydrophobic moieties capable of interaction between themselves in the dispersion, or in a composition comprising the dispersion. The polymeric dispersing agent has a molecular weight in the range of 1,000 to 20,000, preferably in the range of 1,500 to 5,000, and is present in the dispersion in an amount in the range of 0.01 to 2.5 weight percent based on the weight of the particles which are dispersed.

A preferred polymeric dispersing agent is an ionic water soluble ethylenically unsaturated monomer copolymerized with a monomer comprising hydrophobic groups. A preferred ethylenically unsaturated monomer is an ethylenically unsaturated acid selected from the group consisting of: an ethylenically unsaturated carboxylic acid; an ethylenically unsaturated sulfinic acid; an ethylenically unsaturated phosphinic acid; an ethylenically unsaturated phosphonic acid; and combinations thereof.

Preferably, the ethylenically unsaturated acid is free of polyalkylene oxide chains and of other substituents which create side chains of longer than 12 atoms chain length. Preferably, any side chains have a chain length less than 6 atoms.

Preferably, the polymeric dispersing agent of the present invention comprises about 70% to 99% by weight of the ionic water soluble ethylenically unsaturated monomer.

A preferred monomer comprising hydrophobic groups is an ethylenically unsaturated monomer that carries a pendant group —$B_nR$ wherein B comprises an oxyalkyl or an oxyakylene group of 2–4 carbon atoms, n is an integer of 1–50, and R comprises an alkyl, aryl, or arylalkyl group containing 8 to 40 carbon atoms.

Preferably, the monomer comprising hydrophobe groups is present in an amount in the range of about 1% to 30% based on the weight of the polymeric dispersing agent.

A preferred particle is a hydrophilic particle.

A particularly preferred particle is kaolin clay.

A preferred medium is one having an electrolyte concentration less than about 0.25% based on the weight of the dispersion.

By the present invention, a hydrophobically modified dispersed particle slurry is obtained having a rheology which can be uniquely controlled to advantage by the composition of the dispersant, and more specifically by the amount and type of hydrophobe present in the dispersant.

In a coating composition, the present invention provides a pigment dispersion which has sufficiently high shear viscosity to produce good coating holdout. At the same time the coating composition exhibits good shear thinning rheology at high shear to provide runnability on high speed coating equipment.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
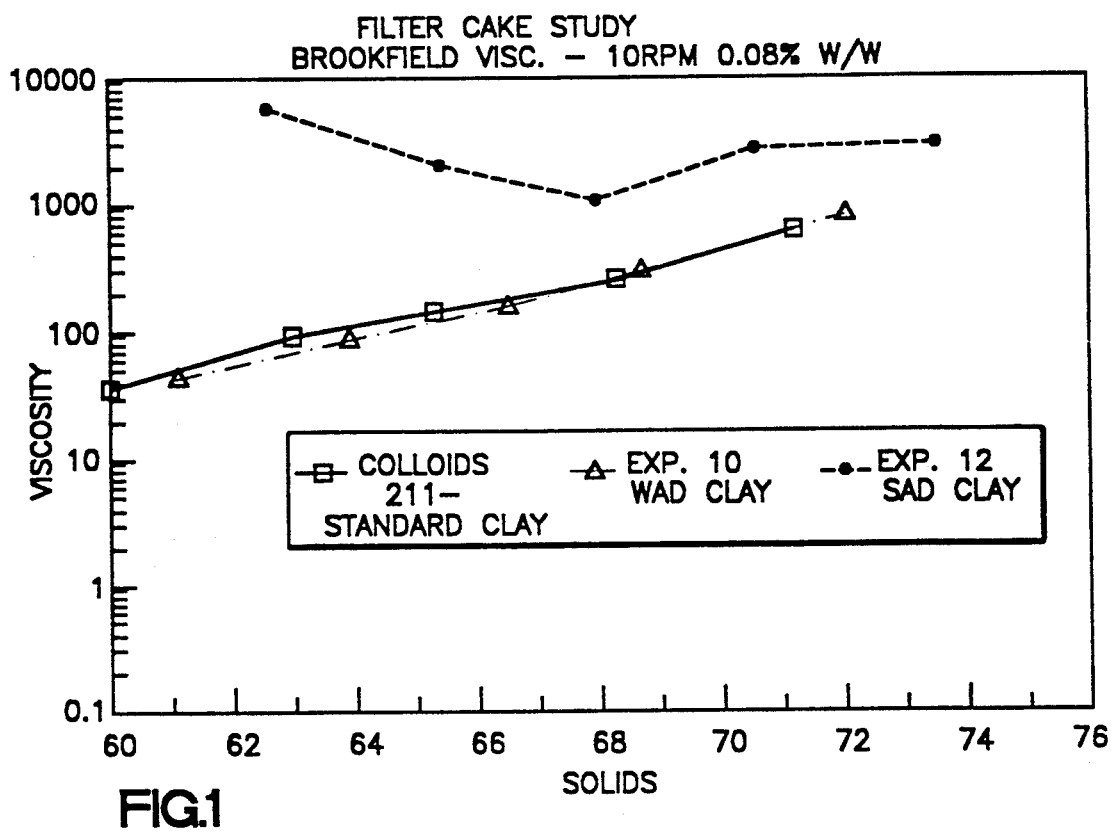
FIG. 1 is a diagram showing the effect of kaolin clay solids on Brookfield viscosity using 0.08% dispersants according to the present invention, compared to the use of the same amount of a conventional sodium polyacrylate dispersant.

In the present application, the terms "dispersion" or "dispersing" are used in their conventional sense, namely with regard to the promotion of a uniform separation of particles in a fluid medium. However, in contrast with conventional dispersants, wherein the dispersant is used in a "thinning" amount, the dispersants of the present invention cause thickening, with the amount of thickening being a function, in part, of the amount of dispersant used. The dispersants of the present invention provide a viscosity which is equal to or greater than that of a dispersion containing the same amount of a conventional sodium polyacrylate dispersant.

The compositions of the present invention are primarily for coatings. The present invention is primarily applicable to the preparation of paper coatings. However, it will be apparent to those skilled in the art that the present invention is also applicable to other types of compositions, for instance ink pastes and paints. The present invention can also be used in the preparation of other compositions such as filters for papers, plastics and rubber. The rubber compositions can be synthetic or natural. The plastics compositions can be thermosetting or thermoplastic. The present invention is also useful in such applications as a pitch control agent in the manufacture of paper, or a composition for the adsorption of ink in the manufacture of recycle paper.

The dispersions of the present invention comprise a fluid medium. The fluid medium can be any fluid medium conventionally employed in the preparation of a dispersion or coating containing the dispersion, for instance a paper coating or a paint coating. A preferred fluid medium, particularly for a paper coating composition, is an aqueous medium. However, the present invention is also applicable to the use of a non-aqueous medium, for instance for the preparation of a solvent-based coating. A non-aqueous solvent can be polar or non-polar. Examples of non-aqueous solvents are toluene, mineral spirits, a paint solvent, and turpentine.

The fluid medium of the present invention is low in electrolyte content. For purposes of the present application, a low-electrolyte medium is defined as one having an electrolyte content less than 0.5%, preferably less than 0.25%, more preferably less than 0.1%.

The dispersants of the present invention function, with regard to dispersing particles in the dispersant compositions, in a conventional manner, by adsorption of anions onto the surface of the particles and formation of counter-ions of opposite charge surrounding each particle. This forms the conventional ionic double layer around each particle. Since each particle has an outer layer of ions of the same charge, one particle is thus repelled from the other. Dissolved electrolytes in the solution, such as dissolved salts, have the effect of collapsing the counter-ion cloud, moving it closer to the particle surface. This reduces the efficiency of the dispersant, and allows the particles to electrostatically flocculate rather than disperse. Such electrostatic flocculation is known to produce dilitent behavior of dispersions.

Preferably, the pH of the medium is adjusted so that it is in the range of 6–9. If necessary, this can be accomplished by adding soda ash ($Na_2CO_3$) to the medium. The adjustment of the pH can be carried out before or after the addition of other ingredients to the composition. Normally, the natural electrolyte content in the compositions of the present invention, due to the presence of the particles being dispersed, and the addition of soda ash for pH adjustment, provides after filtering, in the standard clay process, an electrolyte content less than 0.5%.

The particles of the compositions of the present invention are preferably ionic, in the sense of having a charged surface, as well as hydrophilic. This provides the driving force for adsorption of anions of the dispersants onto the surface of the particles. The particles can be organic or inorganic. The present invention is particularly useful for dispersing kaolin clay in a paper coating composition. Kaolin clay has a surface charge. However, it will be apparent to those skilled in the art that the dispersants of the present invention also have applicability for dispersing other normally charged particles, such as precipitated and ground calcium carbonate, silica, aluminum hydrate, titanium dioxide, composite pigments, gypsum, synthetic organic pigments which have anionic components on their surface, e.g., polystyrene spheres, and mixtures of the above. Specific examples of pigments within the scope of the present invention are a number one kaolin clay marketed by J. M. Huber Corporation under the trademark "HYDRAFINE"; a medium fine wet-ground calcium carbonate marketed by ECC America Inc. under the trademark "CARBITAL 35"; precipitated silica pigment marketed by J M Huber Corporation under the trademark "ZEOLEX"; silica marketed by PPG Industries, Inc. under the trademark "HI-SIL"; titanium dioxide marketed by E. I. Dupont de Nemours under the trademark "TI-PURE"; and industrial gypsum (calcium sulfate dihydrate).

When the dispersions of the present invention are used in a coating, the coating will also comprise a binder. Generally about 4%–20% binder, based on the dry weight of pigment in the coating, is used. Binders used in paper coatings are classified into two groups. The first group is commonly referred to as a latex and is characterized as a synthetic polymer having generally a spherical shape and being dispersible in water. Latices are generally not soluble in water. Examples of latices include but are not limited to styrene-butadiene polymers, vinyl acetate and copolymers thereof, and acrylate esters and copolymers thereof. One suitable latex binder is a styrene-butadiene binder marketed by Dow Chemical Company under the trademark DOW LATEX 635A. The latex can be alkaline swellable, associative, or a standard latex.

The second group of binders used in paper coatings includes a water-soluble binder. An alkaline pH and/or heat may be required for solubility. Water soluble binders which are often used include starch, soy protein, modified soy protein, casein, styrene maleic anhydride polymer, and partially or fully hydrolyzed polyvinyl alcohol. Mixtures of latices and water soluble binders can also be used.

Sole binder or mixtures of binders are commonly used in paper coatings. Sole latex binders generally contain either a relatively high level (3%-10%) of carboxylic acid functionality which permits the development of a coating viscosity with the addition of alkali (alkaline swellable lattices); or may contain associative species such as hydrophobes which are capable of interactions in the coatings to produce a sufficient coating viscosity (associative latices). In the present invention, it was found that the associatively dispersed pigments exhibited a synergy with associative latices to produce beneficial coating rheologies.

The advantages of the present invention can also be achieved with binder mixtures for instance a latex starch binder. Also, it will be apparent that one or more binders may be present hydrophobically modified, for instance, hydrophobically modified starch, soy protein and polyvinyl alcohol. These combinations may enhance coating performance through the same synergistic effect achieved with the use of an associative latex.

The coatings of the present invention can also comprise other ingredients conventionally used in the coating art. For instance, the coating compositions can comprise thickeners such as cellulosic thickeners, e.g., sodium carboxymethyl cellulose, sodium polyacrylate thickeners, associative thickeners, and kelgin. Thickeners used in paper coatings, although they may also act as binders, are generally characterized as being water or alkali soluble or dispersable and as providing coating viscosity and water retention to the coating. They are also distinguished from binders in the instant invention by their low usage levels of generally under 2% based on the pigment present and preferably 0.1% to 1.0%. In the instant invention, it was found that the associatively dispersed pigments of the present invention may be used to advantage with traditional thickeners in coating formulations. In coatings containing a standard styrene butadiene latex and sodium carboxymethyl cellulose as a thickener, weakly associatively dispersed pigments exhibited, as will be shown, increased shear thinning at high shear rates (increased high shear pseudoplastic thixotropy). In coatings containing associative thickeners, both a weakly associatively dispersed and a strongly associatively dispersed pigment exhibited, as will be shown, increased high shear pseudoplastic thixotropy relative to standard dispersed clay.

The coating compositions can comprise cross-linking materials, pigments not capable of being associatively dispersed, dyes, optical brighteners and other dispersants, such as sodium polyacrylate. The coating compositions of the present invention can also comprise biocides, bacteriocides, and defoamers, all conventionally employed in coating compositions. The usual additives are added in conventional amounts to obtain desired formulation properties.

The associative dispersant of the present invention is a polymeric alkali metal or ammonia salt which comprises both hydrophilic moieties and hydrophobic moieties. The hydrophilic moieties should be capable of adsorption onto the charged particles. The hydrophobic moieties should be capable of interaction between themselves and the pigment, in the dispersion or in the coating, and interaction with binders comprising hydrophobes.

Broadly, the hydrophilic moieties are ionic water-soluble, ethylenically unsaturated monomers which are free of polyalkylene oxide chains and of other substituents creating side chains of longer than 12 atoms chain length. Preferably, the side chains have fewer than 6 atoms. Preferred monomers are carboxylic acids of the formula;

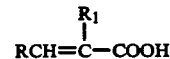

wherein R is H and $R_1$ is H, an alkyl group containing from 1 to 4 carbon atoms, or —$CH_2COOX$; or R is —COOX and $R_1$ is H; and X is H or an alkyl group containing from 1 to 4 carbon atoms. Examples of preferred carboxylic acid monomers are acrylic acid, methacrylic or itaconic acid, and 2-acrylamide-2-methylpropane sulfonic acid. A cationic monomer such as a dialkyl-aminoalkyl (meth)-acrylate or acrylamide may also be used. Instead of an ethylenically unsaturated carboxylic acid monomer, an ethylenically unsaturated sulfinic acid, such as of vinyl sulfinic acid, or an ethylenically unsaturated phosphinic acid, such as of vinyl phosphinic acid, may be used. Also, a vinyl phosphonic acid may be used. Such monomers would have the same formula as defined above except that the —COOH radical(s) would be replaced by —SOOH, —POOH or —$PO_3H$. Also, combinations of an ethylenically unsaturated carboxylic acid, an ethylenically unsaturated sulfinic acid, and an ethylenically unsaturated phosphinic or phosphonic acid can be used.

The associative dispersants of the present invention preferably comprise about 70% to 99% by weight of ionic water-soluble ethylenically unsaturated monomer as above defined.

One suitable hydrophobic moiety is an ethylenically unsaturated monomer that carries a pendant group —$B_nR$ wherein B comprises an oxyalkyl or oxyalkylene group in which the alkyl portion is 2-4 carbon atoms, n is an integer of 1-50, and R comprises an alkyl, aryl or arylalkyl group containing 1 to 40 carbon atoms. Examples of monomers within this scope are known in the art and include those listed in Table 1 of U.S. Pat. No. 4,792,343. This disclosure of this patent is incorporated by reference herein.

Alternatively, the hydrophobic moiety can be an ethylenically unsaturated monomer that carries a pendant group R, wherein R comprises an alkyl, aryl, or arylalkyl group containing 12 to 40 carbon atoms. Examples of monomers within this scope include lauryl acrylate, cetyl acrylate and stearyl acrylate.

As a further alternative, the hydrophobic moiety can be a nonionic urethane-based ethylenically unsaturated monomer comprised of the reaction product of a monoethylenically unsaturated monoisocyanate with 1) a polyhydric alcohol or with 2) nonionic surfactant of the formula

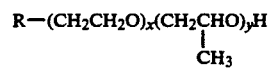

in which i) x is an integer from 0-30, y is an integer from 0-20, and R is a sorbitan fatty ester of the formula

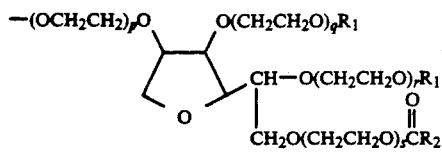

wherein each of p, q, r, and s is an integer and the sum of said integers is from 0–80, $R_1$ is H or $COR_2$, and $R_2$ is alkyl, alkylphenyl or dialkylphenyl having 5 to 30 carbon atoms; or ii) in which x and y are each integers of from 0–40 and R is $-NH(CH_2)_3O-R_3$ or

where $R_2$ is H or $R_3$ and $R_3$ is alkyl, alkyl phenyl, or dialkylphenyl of from 5 to 30 carbon atoms. These urethane-based monomers can be prepared by addition copolymerization following the procedures set forth in U.S. Pat. Nos. 4,600,716, 4,616,074 and 4,743,698, the disclosures of which are incorporated herein by reference.

Preferably, the polymers of the present invention comprise about 0.25% to 30% by weight of ethylenically unsaturated monomer having hydrophobic moieties.

The polymers of the present invention are formulated so as to have molecular weights in the range of 1,000–10,000, preferably 1,500–5,000. The method for formulating the polymers of the present invention can be by addition copolymerization as disclosed in U.S. Pat. Nos. 4,600,761, 4,616,074 and 4,743,698, or by the methods of U.S. Pat. Nos. 4,743,698 and 4,515,098.

The amount of associative dispersant polymer employed in the dispersions of the present invention is a small amount, in the range of about 0.01 to 2.5 weight percent based on the weight of the particles being dispersed. A preferred level of addition is 0.05 to 0.5 w/w% based on pigment, with optimum performance being at 0.08 to 0.1 w/w% based on pigment. The amount of associative dispersant employed, the amount of hydrophobes in the copolymer, and the type of hydrophobe, determine the strength of the association between the particles. A small amount of associative dispersant, or smaller percentage of hydrophobes, achieves a weakly associatively dispersed pigment, hereinafter designated WAD. A larger amount of associative dispersant, or larger percentage of hydrophobes, creates a strongly associatively dispersed pigment, hereinafter designated SAD. A WAD kaolin clay exhibits virtually equal or slightly higher low and high shear viscosity performance, at various weight percent solids, compared to traditionally dispersed kaolin clay using sodium polyacrylate. An SAD clay is characterized by much higher low shear viscosity and higher high shear viscosity than those obtained, at various weight percent solids, compared with traditional amounts of sodium polyacrylate.

The associative dispersions of the present invention can be prepared by dispersing an acidic filter cake, for instance kaolin clay, with an aqueous medium comprising the dispersant, to obtain a dispersion of about 60% solids, and then back-adding to the dispersion either a spray dried standard clay or a spray dried associatively dispersed clay to obtain a final solids content of 70%.

Alternatively, the associative dispersants of the present invention can be added to a previously dispersed filter cake slurry. In this case, the associative dispersant of the present invention can be envisioned as displacing part or all of a previously added dispersant from the pigment, e.g., kaolin clay surface. Pigments, whose manufacturing process does not involve an acidic filter cake, may simply be agitated with the associative dispersant of the present invention to obtain an associative dispersion.

The following Examples illustrate the present invention.

EXAMPLE 1

This Example illustrates the preparation of associatively dispersed pigments in accordance with the present invention, and also illustrates the difference in characteristics obtained by the present invention compared to the prior art.

The associative dispersants employed in this Example are identified as "EXP10" and "EXP12". Both dispersants comprised the sodium salt of acrylic acid copolymerized with an acrylate ester containing 20 moles of ethylene oxide and phenyl stearyl hydrophobes, of the formula $$OH-CH_2-CH_2(OCH_2CH_2)_{19}-O-C_6H_4-C_{18}H_{35}$$

The dispersant "EXP10" comprised 5% by weight acrylate ester and had a molecular weight of about 3,450. The dispersant "EXP12" comprised 8% by weight acrylate ester and had a molecular weight of about 3,650. Compositions containing these dispersants were compared with a composition dispersed by a conventional sodium polyacrylate dispersant marketed by Allied Colloid Limited under the trademark "Colloid 211".

Three compositions comprising the dispersants "EXP10", "EXP12" and "Colloid 211", respectively, were prepared as follows. To three batches of 100 grams each of 63% solids filter cake of No. 1 kaolin clay, 5 cc's (grams) of an aqueous solution was added. Each aqueous solution contained, based on the weight of the solution, 1% by weight of one of the dispersants, "EXP10", "EXP12", and "Colloid 211", and 10% by weight sodium carbonate. This level of addition provided, in each composition, 0.08% by weight dispersant based on the dry weight of the clay. The resulting dispersed filter cakes each had a solids content of 60% by weight. The filter cakes were stirred and had a final pH of seven.

Figure 2:
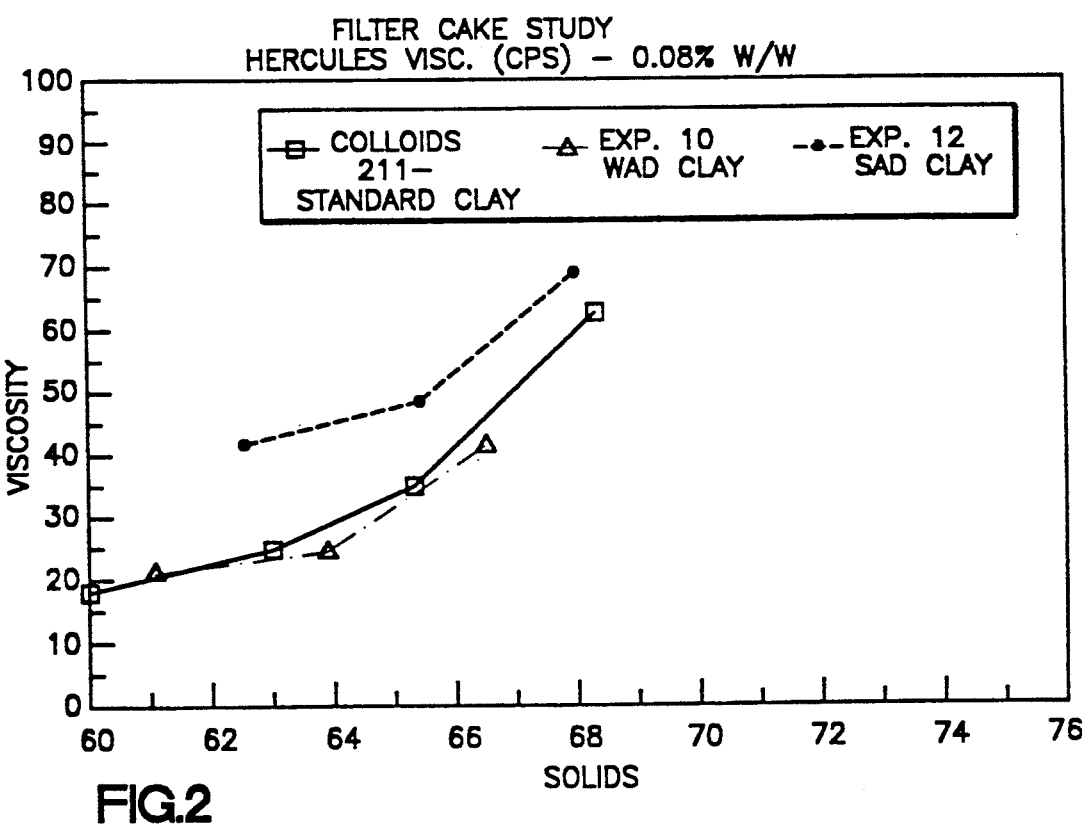
FIG. 2 is a diagram showing the effect of kaolin clay solids on Hercules viscosity using 0.08% dispersants according to the present invention, compared to the use of the same amount of a conventional sodium polyacrylate dispersant.

To each dispersed filter cake, standard spray dried No. 1 kaolin clay was then added in increments up to a solids content of about 70%. At each increment, the viscosity versus solids content was measured. The results are shown in FIGS. 1 and 2. Low shear viscosities (FIG. 1) were measured with a Brookfield viscometer at 10 rpm and high shear viscosities were measured with a Hercules viscometer using an A bob up to 1,100 rpm.

From FIG. 1, it can be seen that the low shear viscosity solids relationship of a WAD clay of the present invention, obtained using the dispersant "EXP10", was virtually equal to that of the standard No. 1 clay dispersed with sodium polyacrylate. However, the SAD clay dispersed with the dispersant "EXP12" exhibited a much higher Brookfield viscosity as a function of solids than did the standard clay. The high shear viscosity, as measured using a Hercules viscometer (FIG. 2), was moderately higher than that of the standard clay, for the WAD clay, and also much higher for the SAD clay.

Further rheological and optical data are summarized in Table I. Relative sediment volumes, which are an indication of the degree of dispersion (a higher relative sediment volume indicates a less dispersed or more aggregated system) under the shear force of a centrifuge, were obtained by centrifuging at 5,000 g-force until the volume of sediment was constant. Gloss, reflectance and light scattering coefficients were measured after coating the 70% solids clay slurries onto optically smooth black glass plates. Equal or increased relative sediment volume, equal or lower gloss, and equal or increased reflectance and scattering coefficient, all indicate that the WAD and SAD kaolin clays exhibited an equal or greater state of aggregation than standard dispersed kaolin clay under low shear conditions.

weight was added. The "Dow 635A" latex is an associative latex and has a mean particle size of 120–130 nanometers. The pH of the composition was adjusted to eight with ammonium hydroxide. The final coating solids was about 60% w/w.

Figure 6:
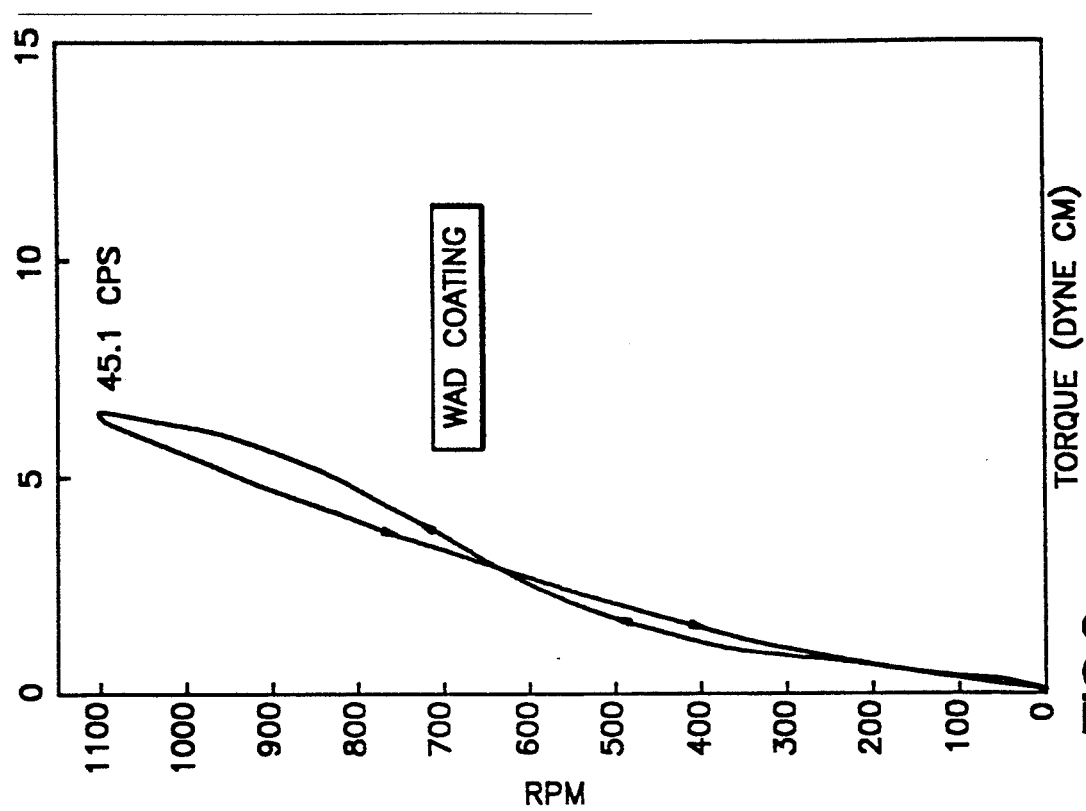
FIG. 6 is a diagram which shows the high shear Hercules rheology of a dispersion of kaolin clay in a latex binder coating, comprising a weakly associated dispersant of the present invention.
Figure 5:
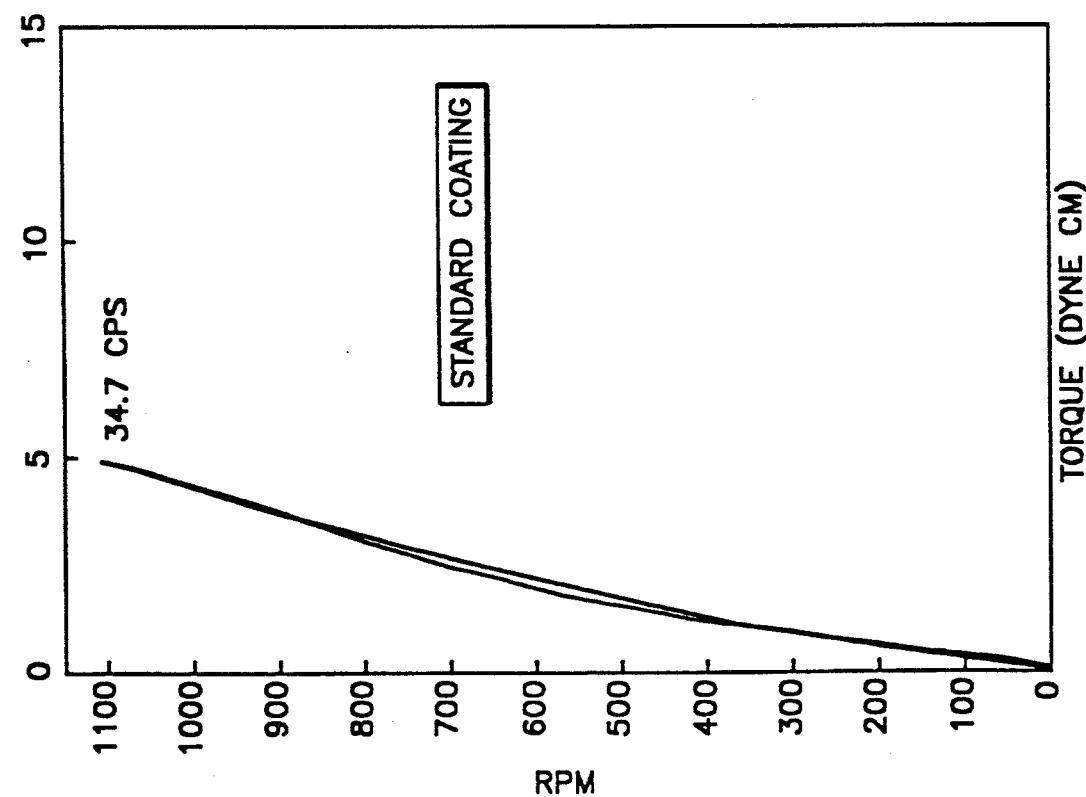
FIG. 5 is a diagram which shows the high shear Hercules rheology of a dispersion of kaolin clay in a latex binder coating, comprising a conventional sodium polyacrylate dispersant.

The compositions were tested in a Hercules viscometer to determine dilatency. A system is dilatent if its rate of increase in strain increases more than linearly with increased shear rate. Torque (dyne centimeters) was measured against rpm. In FIG. 5, which gives the results obtained with the standard clay composition, a slight dilatency or shear thickening, particularly at high shear rates, was obtained. This dilatency is detrimental to runnability. However, the WAD and SAD coatings exhibited (FIGS. 6 and 7) high shear, pseudoplastic thixotropic rheology (shear thinning) which is desirable for runnability. In FIG. 6, in the WAD kaolin clay coating, the dilatency or shear thickening was present between 300 and 600 RPM. However, above 700 RPM,

TABLE 1

| Dispersant | Solids % | Brookfield Visc. (CPS) 10 RPM | Brookfield Visc. (CPS) 100 RPM | Hercules Visc. (CPS) | Relative Sediment Volume | Gloss | Reflectance 457 nm | Reflectance 577 nm | Scattering 457 nm | Coefficient 577 nm |
|---|---|---|---|---|---|---|---|---|---|---|
| Collioids 211 | 70 | 408 | 185 | 13.9 | 40.3 | 79.1 | 66.4 | 58.7 | 0.0583 | 0.0419 |
| EXP 10 | 70 | 492 | 206 | 13.9 | 40.1 | 79.2 | 65.9 | 58.3 | 0.0580 | 0.0420 |
| EXP 12 | 70 | 6360 | 864 | 34 | 41.0 | 74.2 | 72.4 | 65.1 | 0.0783 | 0.0565 |

EXAMPLE 2

The purpose of this Example is to illustrate the difference between associative dispersants of the WAD and SAD types and a conventional dispersant at 0.25% dispersant level.

The same procedures as described in Example 1 were employed in preparing the dispersions except that 0.25% "Colloids 211", "EXP10" and "EXP12" were used to produce standard dispersed clay, WAD clay and SAD clay, respectively. To three batches of 100 grams each of 63% solids filter cake of No. 1 kaolin clay, 5cc's (grams) of an aqueous solution was added. Each aqueous solution contained, based on the weight of the solution, 2.5% by weight of one of the dispersants "EXP10", "EXP12" and "Colloid 211", and 10% by weight sodium carbonate. The level of addition provided, in each composition, 0.25% by weight dispersant based on the dry weight of the clay. The resulting dispersed filter cakes each had a solids content of 60% by weight. The filter cakes were stirred and had a final pH of seven.

To each dispersed filter cake, standard spray dried No. 1 kaolin clay was then added in increments up to a solids content of about 70%. At each increment, the viscosity versus solids content was measured as in Example 1.

Figure 3:
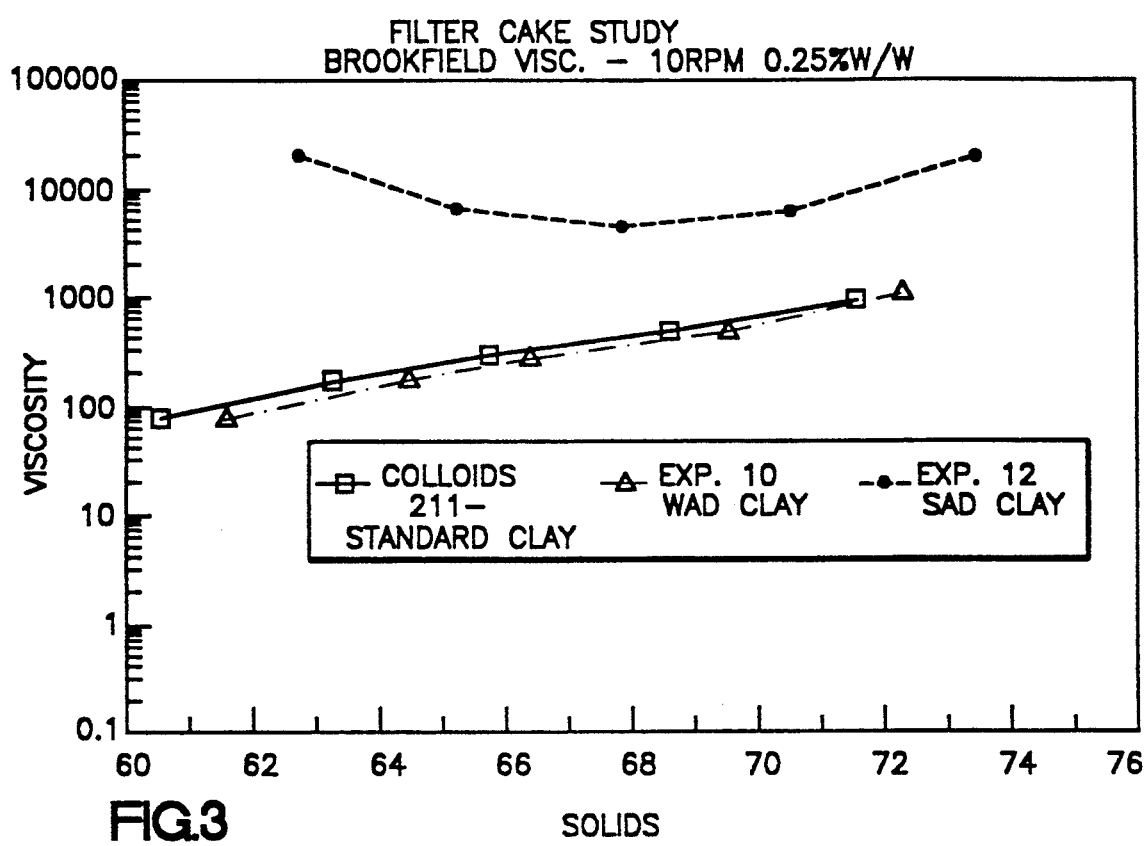
FIG. 3 is a diagram showing the effect of kaolin clay solids on Brookfield viscosity using 0.25% dispersants according to the present invention, as compared to use of the same amount of a conventional sodium polyacrylate dispersant.
Figure 4:
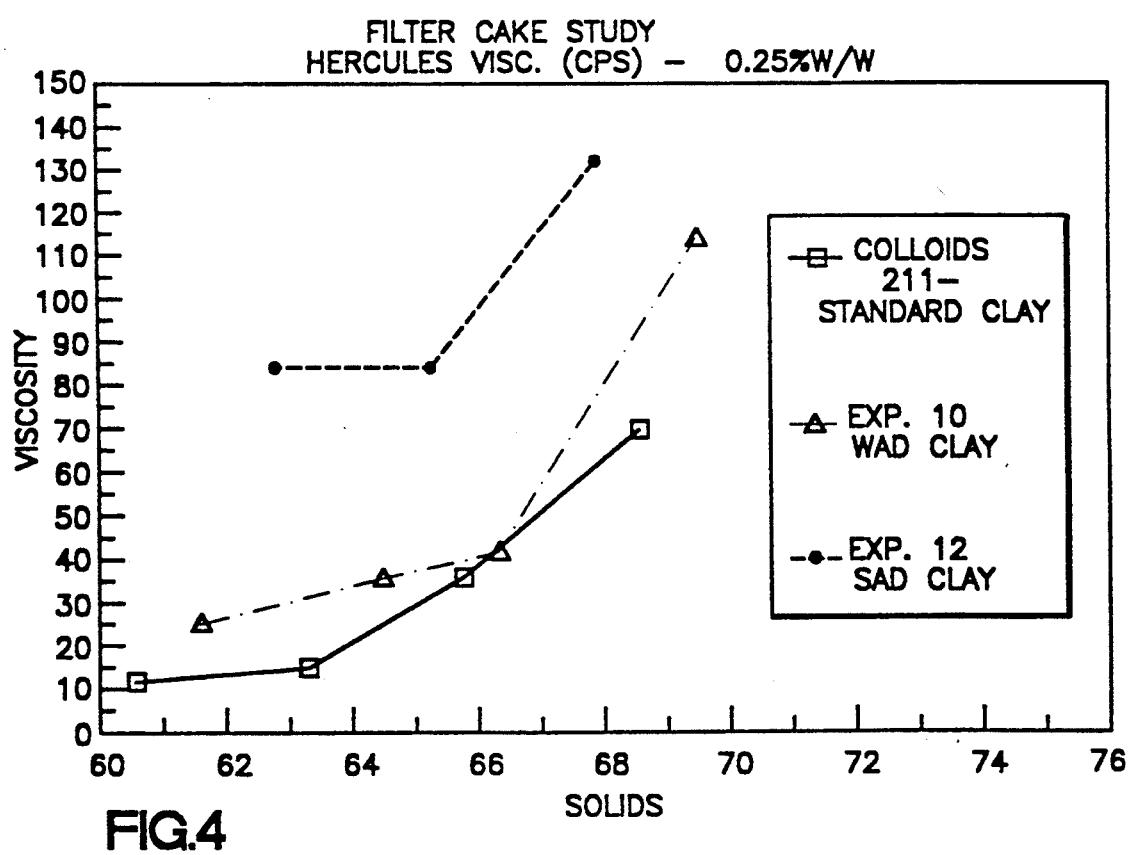
FIG. 4 is a diagram showing the effect of kaolin clay solids on Hercules viscosity using 0.25% dispersants according to the present invention, compared to use of the same amount of a conventional sodium polyacrylate dispersant.

The results are shown in FIGS. 3 and 4, and illustrate that the WAD clay and SAD clay exhibited viscosity, as a function of solids, equal or higher than that of standard dispersed clay.

EXAMPLE 3

Figure 7:
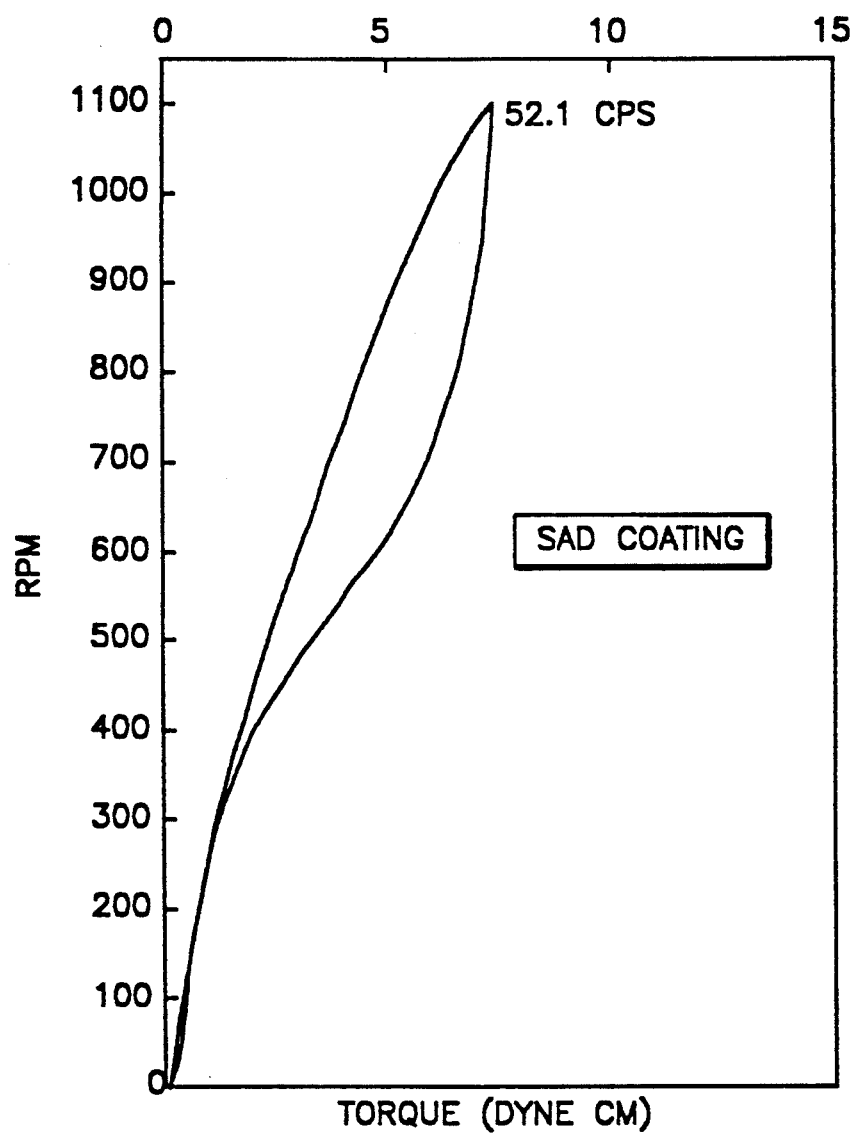
FIG. 7 is a diagram showing the high shear Hercules rheology of a dispersion of kaolin clay, in a latex binder coating, comprising a strongly associated dispersant according to the present invention.

The purpose of this Example is to demonstrate the rheological benefits obtained by the WAD and SAD clays of the present invention in sole binder coatings. The standard No. 1 clay, the WAD No. 1 clay and SAD No. 1 clay were prepared as described in Example 1. The 70% clay slurries were then diluted with water to about 62% w/w solids. To each of these slurries, 13% "Dow 635A" latex (trademark) based on dry clay the coating exhibited significant shear thinning. In FIG. 7, this very unique coating rheology is further enhanced. At low shear rate, traditional coating viscosity was present. At medium shear rate, about 500 RPM, a short period of dilatency was observed in which the wet coating structure was built. At high shear rate, above about 600 RPM, the coating became very shear thinning. In addition, the increased high shear viscosity with WAD and SAD clays provided a basis for improved coating holdout. As seen in the following Table 2, these advantages are obtained while maintaining traditional low shear viscosities required to give satisfactory flow during transfer and pumping of the coating.

TABLE II

| Type of Clay in the Coating | Dispersant | % Solids | Brookfield Viscosity CPS 10 RPM | Brookfield Viscosity CPS 100 RPM | Hercules Viscosity CPS |
|---|---|---|---|---|---|
| Standard | (Colloids 211) | 60.4 | 2570 | 522 | 34.7 |
| WAD | (EXP 10) | 60.6 | 2600 | 526 | 45.1 |
| SAD | (EXP 12) | 60.6 | 3350 | 592 | 52.1 |

The performance of the WAD clays provides a number of benefits. Because the dispersed clay particles contain hydrophobes, the dried product will be more oleophilic, than for instance the conventionally dispersed clay, and thus will be more dispersable in an organic medium such as rubber, a solvent based paint, and a plastic. In addition, the kaolin clay surface, in a paper coating, can be appropriately modified to provide a hydrophilic lipophilic balance necessary to achieve increased ink affinity and improved printability.

The SAD clays, by exhibiting a much higher lower shear viscosity, than that obtainable with traditional sodium polyacrylate, as shown in FIGS. 1 and 2, exhibit a substantial wet coating structure. This is believed to be due to the interaction of hydrophobes attached to the closely approaching kaolin particles.

FIGS. 1 and 2 also showed that with the SAD clay, a higher high shear viscosity, than that obtainable with traditional sodium polyacrylate, was achieved. At the same time, as shown in FIG. 7, the coating with SAD clay achieved a high shear thinning rheology. Thus, the SAD clay provided both runnability and coating holdout. It is believed that hydrophobes attached to the SAD kaolin clay particles also associate with the hydrophobes attached to the latex particles. This yields a clay-latex-clay network which is beneficial in terms of achieving a uniform distribution of latex binder in the coating and preventing binder migration, overcoming such printing problems as mottle and coating pick. This is also useful in preventing both capillary, gravity and pressure driven flow of coating into the base paper.

However, the forces of attraction between the SAD kaolin clay particles and latex particles are Vander Walls in nature and thus weak compared to polymeric bridging. This can be termed shear thinning bridging. At the zone of blade metering, the stress imparted by the blade to the coating results in a loss of the wet coating structure to give the substantial shear-thinning rheology shown in FIG. 7. Thus the beneficial effects of blade runnability are also achieved.

EXAMPLE 4

The purpose of this Example is to illustrate that coatings employing a standard paper latex binder, a traditional thickener and WAD and SAD clay may be prepared and show rheological advantage over the use of a standard dispersed clay. Standard clay, WAD clay and SAD clay slurries were prepared at 70% solids as described in Example 1. These slurries were diluted with water to 61% solids. With mixing, 1% sodium carboxymethylcellulose based on dry clay was slowly added and mixed for ten minutes. Sufficient "Dow 620A" styrenebutadiene latex, having a particle size of 180 nanometers, was added with mixing to give a latex content in the coating of 13% and a final solids of about 60%. The rheological data which was obtained is summarized in Table 3.

TABLE III

| Type of Clay in the Coating | Dispersant | % Solids | Brookfield Viscosity CPS 10 RPM | Hercules Viscosity CPS 1100 RPM | High* Shear Rheology |
|---|---|---|---|---|---|
| Standard | (Colloids 211) | 59.6 | 5900 | 55.6 | low PT |
| WAD | (EXP 10) | 59.7 | 6120 | 63.2 | medium PT |
| SAD | (EXP 12) | 60.0 | 6680 | 57.0 | low PT |

*PT = pseudoplastic Thixotropy

From Table 3, it is apparent that the WAD clay imparts slightly higher high shear viscosity with increased high shear pseudoplastic thixotropy (shear thinning) compared to the standard dispersed clay.

EXAMPLE 5

The purpose of this Example is to illustrate that coatings containing a standard paper latex binder, an associative thickener, and WAD and SAD clays may be prepared and show rheological advantage over the control coating containing standard dispersed clay. Coatings were prepared as described in Example 4 except that either 0.25% associative thickener SL76 or SL98 (Alco Chemical) were added instead of sodium carboxymethylcellulose. Results are summarized in Table 4.

TABLE IV

| Type of Clay in the Coating | Dispersant | Thickener | % Solids | Brookfield Viscosity CPS 10 RPM | Brookfield Viscosity CPS 100 RPM | Hercules Viscosity CPS 1100 RPM | High Shear Rheology |
|---|---|---|---|---|---|---|---|
| Standard | Colloids 211 | SL76 | 59.7 | 6300 | 1104 | 53.5 | low PT |
| WAD | EXP 10 | SL76 | 59.7 | 6300 | 1105 | 59.5 | med PT |
| SAD | EXP 12 | SL76 | 59.7 | 7900 | 1430 | 59.0 | med PT |
| Standard | Colloids 211 | SL98 | 59.5 | 5820 | 1008 | 50.7 | low PT |
| WAD | EXP 10 | SL98 | 59.6 | 6280 | 1096 | 54.2 | low PT |
| SAD | EXP 12 | SL98 | 59.6 | 4840 | 908 | 59.0 | high PT |

It is seen that depending on the system, both WAD and SAD clays exhibit synergy with associative thickeners in developing high shear pseudoplastic thixotropic (shear thinning rheology).

From the above description of the invention, those skilled in the art will perceive improvements, changes and modifications. Such improvements, changes and modifications within the skill of the art are intended to be covered by the appended claims.

Having described the invention, the following is claimed:

1. A dispersion comprising:
   a hydrophilic particles;
   a fluid medium having less than 0.5% by weight electrolyte based on the weight of the fluid medium;
   a polymeric dispersing agent in an effective amount to disperse said hydrophilic particles wherein the viscosity of the dispersion is equal to or greater than that obtained with an equivalent weight percentage of a sodium polyacrylate dispersant having a molecular weight in the range of 1,500 to 5,000 and wherein the polymeric dispersing agent is a polymeric salt of an ionic water-soluble, ethylenically unsaturated monomer which is free of polyalkylene oxide chains and other substituents creating side chains longer than 12 atoms chain length and an ethylenically unsaturated monomer comprising hydrophobic moieties and said dispersing agent is
   (a) soluble or dispersable in said medium;
   (b) associative in nature in that the hydrophobic moieties are capable of interactions between themselves in the dispersion or in a coating comprising the dispersion;
   (c) used in the range of 0.01 to 2.5 weight percent based on the weight of hydrophilic particles being dispersed; and
   (d) has a molecular weight in the range of 1,000 to 20,000.

2. The dispersion of claim 1 wherein said fluid medium is an aqueous medium having a pH in the range of 6-9.

3. The dispersion according to claim 1 wherein said polymeric dispersing agent comprises 70–99% by weight ionic water soluble ethylenically unsaturated monomer polymerized with 0.25–30% by weight ethylenically unsaturated monomer comprising hydrophobic groups.

4. The dispersion according to claim 3 in which the ethylenically unsaturated monomer comprising hydrophobic groups is selected from the group consisting of:
(a) an ethylenically unsaturated monomer having the pendant group —$B_nR$ wherein B is an oxyalkyl or oxyalkylene group of 2–4 carbon atoms, and n is an integer of 1–50 and R is an alkyl, aryl, or arylalkyl group containing 1 to 40 carbon atoms;
(b) an ethylenically unsaturated monomer that carries a pendant group R wherein R comprises an alkyl, aryl or arylalkyl group containing 12 to 40 carbon atoms; and
(c) a nonionic urethane-based ethylenically unsaturated monomer comprised of the urethane reaction product of a nonionic surfactant or polyhydric alcohol with a monoethylenically unsaturated monoisocyanate.

5. The dispersion of claim 4 wherein said nonionic surfactant has the formula $$R-(CH_2CH_2O)_x(CH_2CHO)_yH$$
$$|$$
$$CH_3$$

in which i) x is an integer from 0–30, y is an integer from 0–20, and R is a sorbitan fatty ester of the formula

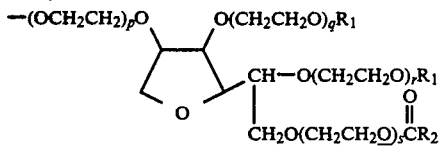

wherein each of p, q, r, and s is an integer and the sum of said integers is from 0–80 $R_1$ is H or $COR_2$, and $R_2$ is alkyl, alkylphenyl or dialkylphenyl having 5 to 30 carbon atoms; or ii) in which x and y are each integers of from 0–40 and R is —$NH(CH_2)_3O$—$R_3$ or

where $R_2$ is H or $R_3$ and $R_3$ is alkyl, alkyl phenyl, or dialkylphenyl of from 5 to 30 carbon atoms.

6. The dispersion of claim 3 wherein said ionic, water soluble ethylenically unsaturated monomer is a carboxylic acid, a sulfonic acid, a phosphinic acid, a phosphonic acid, or a combination thereof.

7. The dispersion of claim 3 wherein said ionic, water soluble ethylenically unsaturated monomer is a copolymerizable α, β unsaturated carboxylic acid monomer of the formula selected from the group consisting of:

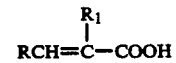

wherein R is H and $R_1$ is H, an alkyl group containing from 1 to 4 carbon atoms, or —$CH_2COOX$, X being H or an alkyl group containing from 1 to 4 carbon atoms; or
wherein R is —COOX, and $R_1$ is H, X being H or an alkyl group containing from 1 to 4 carbon atoms.

8. The dispersion of claim 1 wherein said hydrophilic particles comprise an inorganic pigment.

9. The dispersion of claim 8 wherein said inorganic pigment is a kaolin clay.

10. The dispersion of claim 1 further comprising a dispersant which is non-associative in nature.

11. A coating composition comprising the dispersion of claim 1 further comprising a binder and one or more additives selected from the group consisting of thickeners, lubricants, defoamers, antifoamers, bactericides, dyes and cross-linking agents.

12. The coating composition of claim 11 wherein said binder is a latex comprising associative species.

13. The coating composition of claim 11 comprising an associative thickener.

14. A coating composition comprising the dispersion of claim 1 wherein said particles are selected from the group consisting of kaolin clay, calcined clay, silica, aluminum hydroxide, calcium carbonate, titanium dioxide, gypsum, chemically or physically aggregated single pigments of the above or composite pigments of one or more of the above.

15. A coating composition comprising the dispersion of claim 1 further comprising polymeric plastic spheres which may be solid or hollow.

16. A coating composition comprising the dispersion of claim 1 further comprising a binder.

17. The coating composition of claim 16 wherein said binder is selected from the group consisting of alkaline swellable lattices, associative lattices, standard lattices, starch, soy protein, casein, and polyvinyl alcohol, which may or may not be hydrophobically modified, in the amount of 4%–20% by weight based on the solid content of particles in said coating, said coating comprising zero to an effective amount of crosslinkers, optical brighteners, dyes, lubricants, antifoamers, defoamers, bactericides, and combinations thereof.

* * * * *